United States Patent [19]
Takemori et al.

[11] Patent Number: 5,951,930
[45] Date of Patent: *Sep. 14, 1999

[54] MANUFACTURING APPARATUS FOR PROFILE EXTRUSION MOLDED ARTICLES AND MANUFACTURING METHOD FOR THE SAME

[75] Inventors: Hirotsugu Takemori, Toyota; Makoto Mori, Kariya; Yoshimasa Fukaya, Chiryu, all of Japan

[73] Assignee: Aisin Seiki Kabushiki Kaisha, Kariya, Japan

[ * ] Notice: This patent issued on a continued prosecution application filed under 37 CFR 1.53(d), and is subject to the twenty year patent term provisions of 35 U.S.C. 154(a)(2).

[21] Appl. No.: 08/721,714

[22] Filed: Sep. 27, 1996

[30]     Foreign Application Priority Data

Sep. 29, 1995   [JP]   Japan .................................... 7-253847

[51] Int. Cl.$^6$ .................................................. B29C 47/16
[52] U.S. Cl. .................... 264/167; 264/177.16; 425/381; 425/465; 425/466; 425/467
[58] Field of Search ............................. 264/167, 177.16, 264/40.7; 425/381, 462, 466–467, 133.1, 131.1, 465

[56]                References Cited

U.S. PATENT DOCUMENTS

| | | | |
|---|---|---|---|
| 4,283,168 | 8/1981 | Miller et al. ............................ | 425/465 |
| 4,552,521 | 11/1985 | Linnstaedter ............................ | 425/462 |
| 4,906,171 | 3/1990 | Miller ................................ | 264/177.16 |
| 5,110,529 | 5/1992 | Arima ................................ | 264/177.16 |
| 5,162,090 | 11/1992 | Arima ................................ | 264/177.16 |
| 5,229,054 | 7/1993 | Yada et al. ............................. | 264/167 |
| 5,441,688 | 8/1995 | Goto et al. ........................... | 264/177.16 |
| 5,447,670 | 9/1995 | Ito et al. ............................. | 264/177.16 |
| 5,567,368 | 10/1996 | Ando et al. ............................ | 264/167 |

FOREIGN PATENT DOCUMENTS

| | | |
|---|---|---|
| 3-128721 | 5/1991 | Japan . |
| 3-143730 | 6/1991 | Japan . |
| 4-338523 | 11/1992 | Japan . |
| 4-356217 | 12/1992 | Japan . |

*Primary Examiner*—Jan H. Silbaugh
*Assistant Examiner*—Mark Eashoo
*Attorney, Agent, or Firm*—Oblon, Spivak, McClelland, Maier & Neustadt, P.C.

[57]              ABSTRACT

Aa apparatus for manufacturing profile extrusion molded articles having a gradually transforming portion at which its cross section gradually changes includes a stationary die block having an aperture in a shape of the maximum cross section of the gradually transforming portion and a resin passage in communication with the aperture, an extruder extruding resin material of a gradually changing amount to an inlet of the resin passage, and flow direction controlling means for changing a flow direction of the resin material flowing within the resin passage in accordance with the extruding amount of the resin material. The manufacturing apparatus can produce profile extrusion molded articles without any bypass passage, avoid the resin material to be discharged outside the stationary die block, and prevent unsightly lines tracing a shutter movement from appearing on the design surface of the extrusion molded articles.

5 Claims, 9 Drawing Sheets

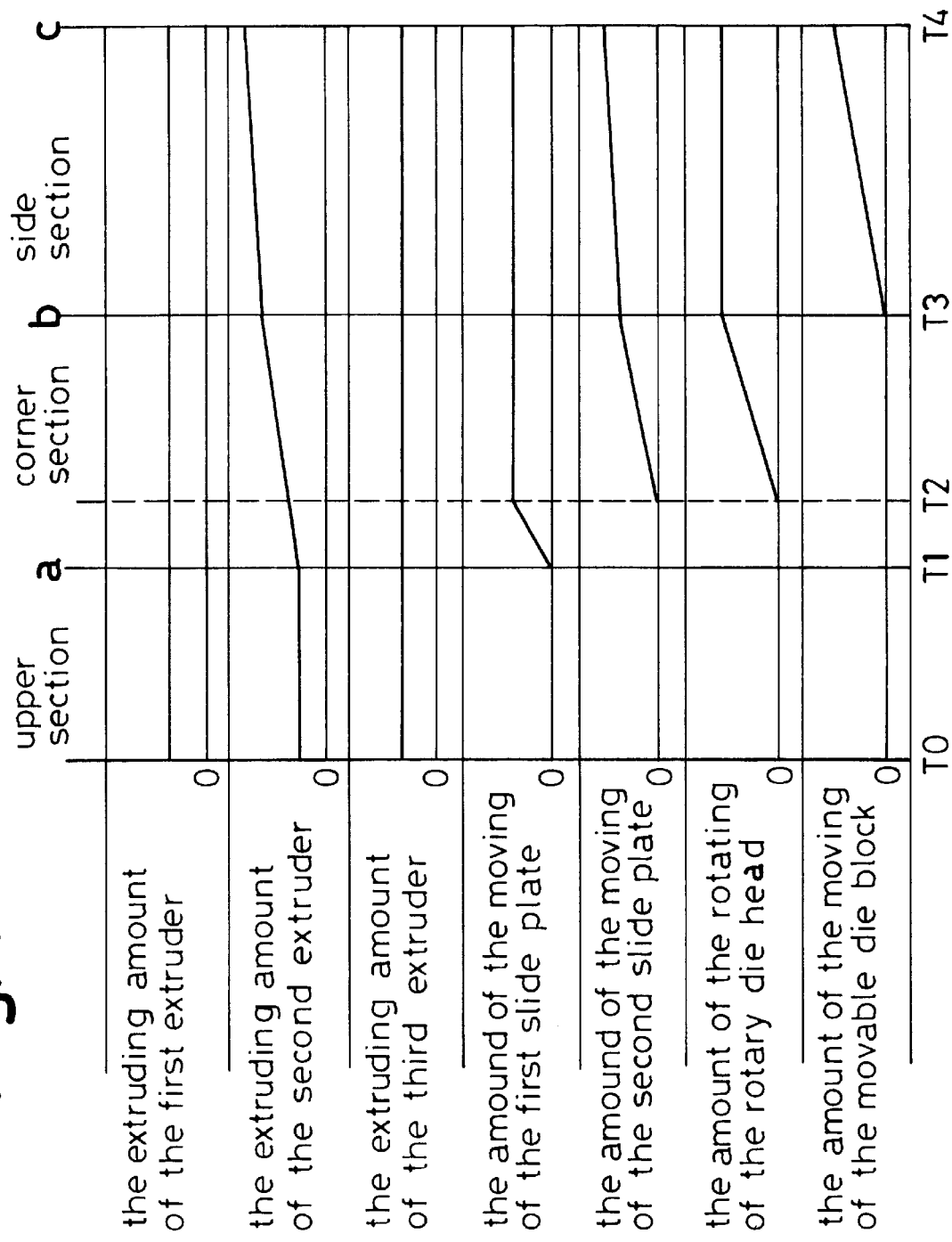

ively, showing an essential portion of the manufacturing apparatus shown in FIG. 8; and

MANUFACTURING APPARATUS FOR PROFILE EXTRUSION MOLDED ARTICLES AND MANUFACTURING METHOD FOR THE SAME

BACKGROUND OF THE INVENTION

1. Field of the Invention

This invention relates to a manufacturing apparatus for profile extrusion molded articles having a gradually transforming portion at which the cross section thereof is gradually transformed, and a manufacturing method for the same.

2. Description of Related Art

An apparatus has been known from Japanese Patent Unexamined Publication (KOKAI) Heisei 4-338,523 for manufacturing profile extrusion molded articles having a gradually transforming portion at which the cross section thereof is gradually transformed. It includes a stationary die block having a main resin passage, at an outlet of which an aperture is formed in the shape of the maximum cross section of the gradually transforming portion, an extruder for feeding a fixed amount of resin material to the main resin passage, a bypass passage branching off the main resin passage for discharging extra resin material remaining within the main resin passage outside the stationary die block, and a pivotable shutter for changing the aperture size of the main resin passage as well as changing the outlet area size of the bypass passage in correspondence with changing of the main resin passage.

The manufacturing method for profile extrusion molded articles disclosed in the above Publication includes using the manufacturing apparatus described above to perform the steps of feeding a fixed amount of resin material (namely, a resin amount corresponding to the maximum cross section) to the inlet of the main resin passage of the stationary die block, changing the size of the aperture of the main resin passage by rotating the shutter, and thereupon manufacturing the profile extrusion molded articles whose the cross section is gradually transformed. The extra resin material in the main resin passage is discharged outside the stationary die block through the bypass passage.

With this apparatus and method, however, since a fixed amount of resin material is fed to the main resin passage, the extra resin material in the main resin passage must be discharged outside the stationary die block through the bypass passage as described above. Therefore, the bypass passage must be formed in the stationary die block and more resin material than is necessary, so that the apparatus and method tend to be expensive. Moreover, since the shutter gradually changes the aperture size of the outlet of the main resin passage, parting lines tracing the shutter's movement occur on the exposed face of the extrusion molded articles, thereby impairing the appearance of the molded articles.

SUMMARY OF THE INVENTION

It is an object of the invention to provide an apparatus and method in which molded articles are properly produced without using a bypass passage to discharge resin material to outside of a stationary die block.

It is another object of the invention to provide an apparatus and method in which parting lines tracing the shutter's movement will not appear on the exposed face of the extrusion molded articles.

According to the invention, the apparatus for manufacturing profile extrusion molded articles having a gradually transforming portion at which a cross section is gradually changed includes a stationary die block having an aperture in the shape of the maximum cross section of the gradually transforming portion and a resin passage in communication with the aperture, an extruder extruding resin material of a gradually changing amount to an inlet of the resin passage, and flow direction controlling means for changing a flow direction of the resin material flowing within the resin passage in accordance with the extruding amount of the resin material. The manufacturing method according to the invention includes using the apparatus to perform the steps of extruding the resin material of a gradually changing amount to the aperture through the extruder and, at the same time, using the resin flow direction controlling means to change the flow direction of the resin material flowing in the resin passage in accordance with the extruded amount of the resin material.

According to this apparatus and method, no extra resin remains in the resin passage because the resin material of a gradually changing amount is extruded to the inlet of the resin passage, so that no bypass passage is needed and the resin material is no longer discharged outside the stationary die block. Therefore, the apparatus is lower in cost.

The profile extrusion molded articles having a gradually transforming portion are molded by extruding the resin material of the gradually changing amount to the inlet of the resin passage by means of the extruder and by changing the flow direction in the resin passage by the flow direction controlling means in accordance with the extruding amount of the resin material. Therefore, it is unnecessary to use a shutter for changing the size of the aperture in accordance with the cross section of the gradually transforming portion, and therefore no line tracing the movement of the shutter will appear on the face of the extrusion molded articles.

Since the flow direction of the resin material in the resin passage is changed in accordance with the extruding amount of the resin material by the flow direction controlling means, the extrusion molded articles are not formed with indentations or bumps, thereby improving the quality of the molded articles. It is preferred for the apparatus to use a slide plate capable of withdrawing from the resin passage disposed in the stationary die block. This slide plate allows the resin material in the resin passage to change its flow direction with a simple mechanism.

BRIEF DESCRIPTION OF THE DRAWINGS

The above and other objects and features of the invention will be apparent to those skilled in the art from the following preferred embodiments when considered in conjunction with the accompanied drawings, in which:

FIGS. 3 to 7 are cross sections showing the windshield molding in which FIG. 3 is taken along line A—A in FIG. 2, FIG. 4 is taken along line B—B in FIG. 2, FIG. 5 is taken along line C—C in FIG. 2, FIG. 6 is taken along line D—D in FIG. 2 and FIG. 7 is taken along line E—E in FIG. 2;

FIG. 11 is a time chart showing operation of the manufacturing apparatus for the windshield in FIG. 8.

DETAILED DESCRIPTION OF THE PREFERRED EMBODIMENT

Figure 1:
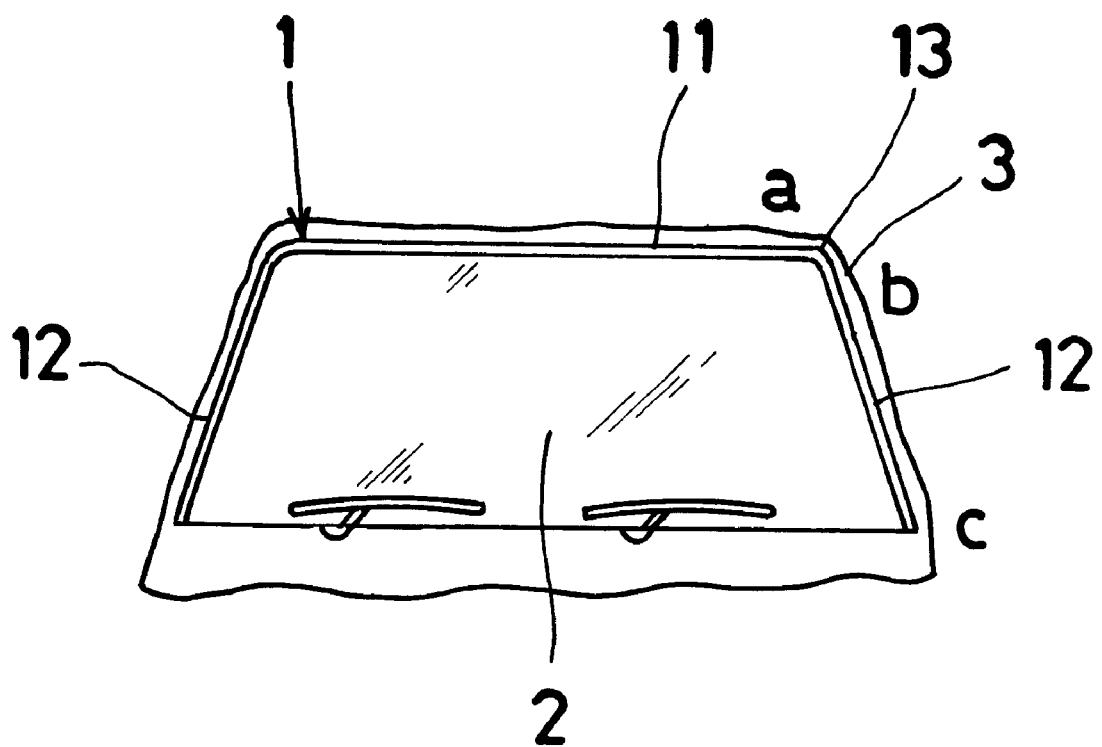
FIG. 1 is a front view showing a windshield of a vehicle mounting a windshield molding produced by an apparatus according to the invention.
Figure 2:
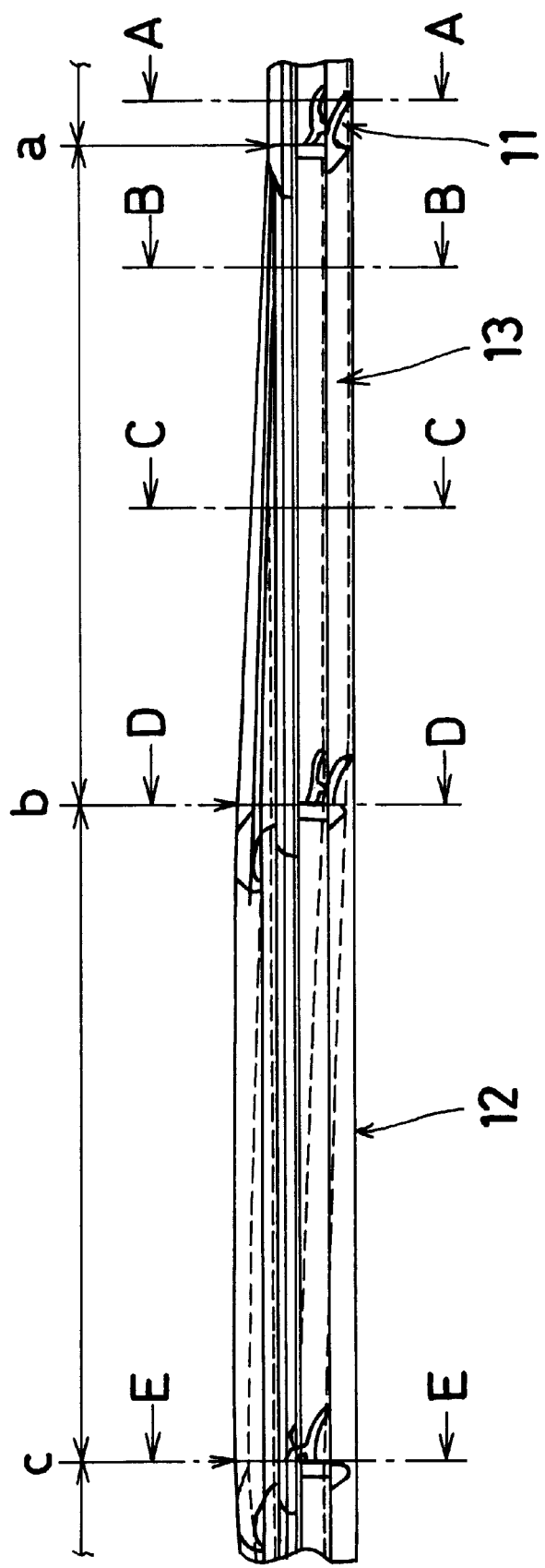
FIG. 2 is a front view showing the windshield molding shown in FIG. 1 before it is bent.

Referring to FIG. 1 to 7, a windshield molding or dam 1 produced by an apparatus according to an embodiment of the invention is arranged around the edge of a vehicle windshield and is secured to a vehicle body panel 3. The windshield molding 1 is constituted of an upper section 11 contacting an upper edge of the windshield 2, side sections 12 each contacting a side edge of the windshield 2, and corner sections 13 located between the upper section 11 and the side section 12. In FIG. 2, the upper section 11 corresponds to a section located on the right side of point a; the corner section 13 corresponds to a section located between points a and b; the side section 12 corresponds to a section located on the left side of the point b.

Figure 3:
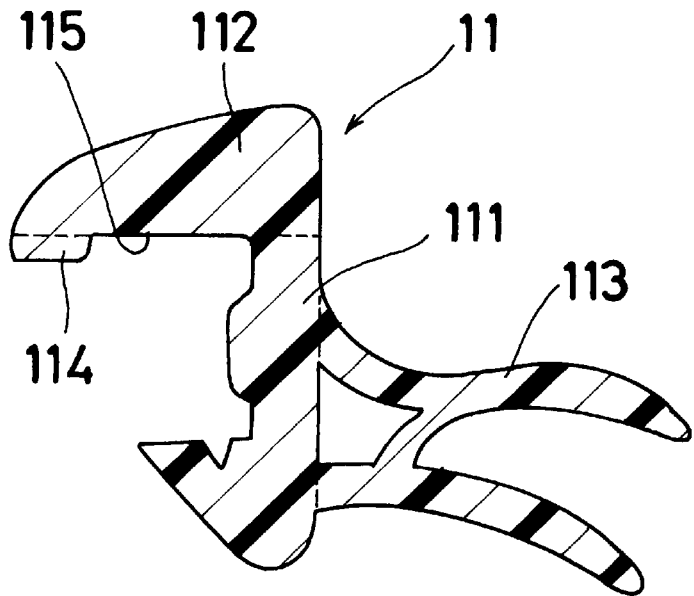

As shown in FIGS. 2 and 3, the upper section 11 is formed of a vinyl chloride resin and includes a leg portion 111, a head portion 112, a resilient lip 113 and a small protuberance 114. The leg and head portions form a glass insertion groove 115 for fitting in the upper edge of the windshield 2. The head portion 112 is connected unitedly to the upper portion of the leg portion 111; a top surface of the head portion in FIG. 3 becomes a design or ornamental surface. The resilient lip 113 has a cross section approximately in a letter H shape and is connected unitedly to the side in FIG. 3 of the leg portion 111. The resilient lip 113 is secured to the vehicle body panel 3 to prevent rain or the like from entering the inside from the outside. The small protuberance 114 is projected downward in FIG. 3 from the bottom of the head portion 112.

Figure 4:
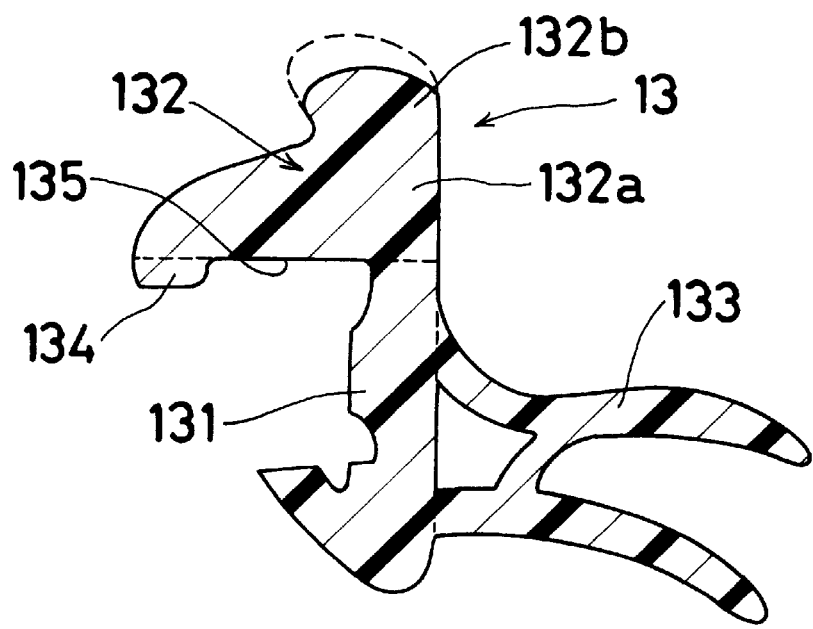
Figure 5:
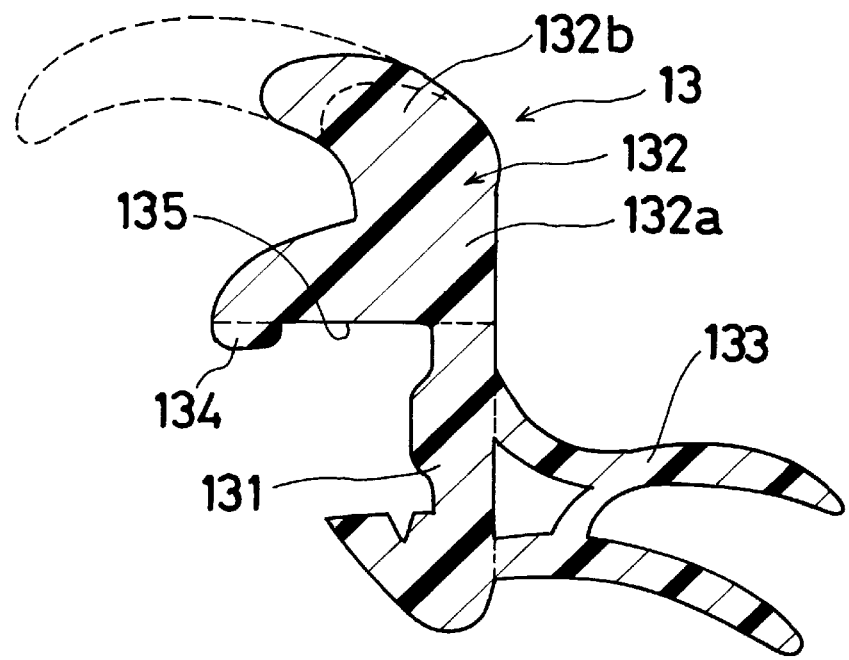

As shown in FIGS. 2, 4 and 5, the corner section 13 is formed of a vinyl chloride resin and includes a leg portion 131, a head portion 132, a resilient lip 133, a small protuberance 134 and a glass insertion groove 135. The leg portion 131 is continuously formed with the leg portion 111 of the upper section 11 and in the same shape. The head portion 132 is continuously formed with the head portion 112 of the upper section 11 and includes a body portion 132a having a constant cross section, and a gradually transforming portion 132b having a gradually transforming cross section. The body portion 132a is formed in the same shape as the head portion 112. The gradually transforming portion 132b has a cross section becoming wider when going from an upper side to a lower side in FIG. 1, or going to the left side in FIG. 2, and has a design surface on the top end surface in FIGS. 4 and 5.

The resilient lip 133 is continuously formed with the resilient lip 113 of the upper section 11, formed in the same shape as the resilient lip 113, and connected in the same manner as the resilient lip 113 at the connecting position. The resilient lip 133 is secured to the vehicle body panel 3 to prevent rain or the like from entering the inside from the outside. The small protuberance 134 is formed continuously with the small protuberance 114 and has the same shape as the small protuberance 114. The glass insertion groove 135 is for fitting the corner edge of the windshield 2 therein and is formed continuously with the glass insertion groove 115 of the upper section 11.

Figure 6:
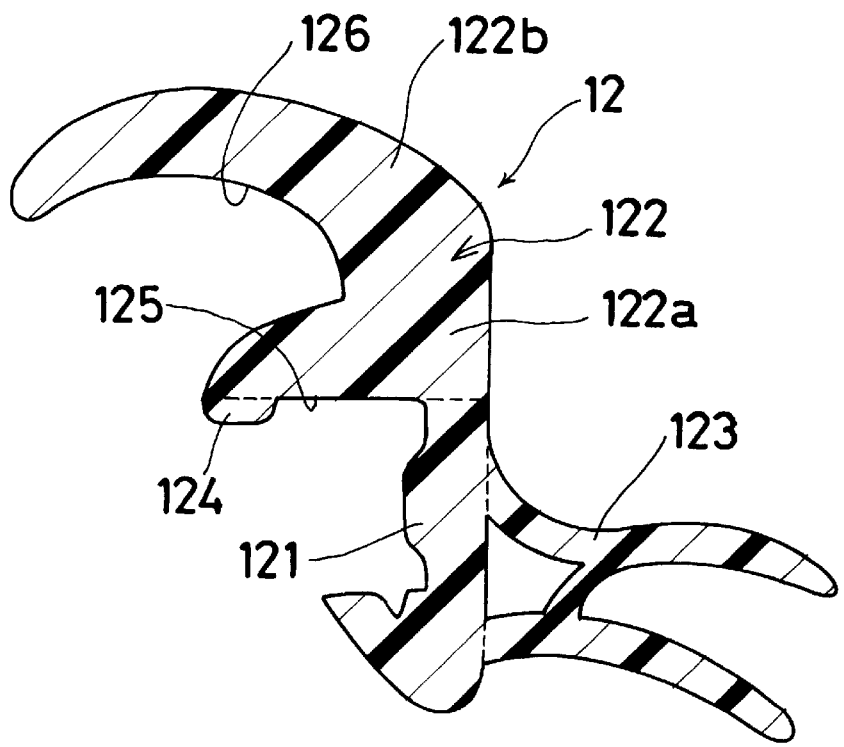
Figure 7:
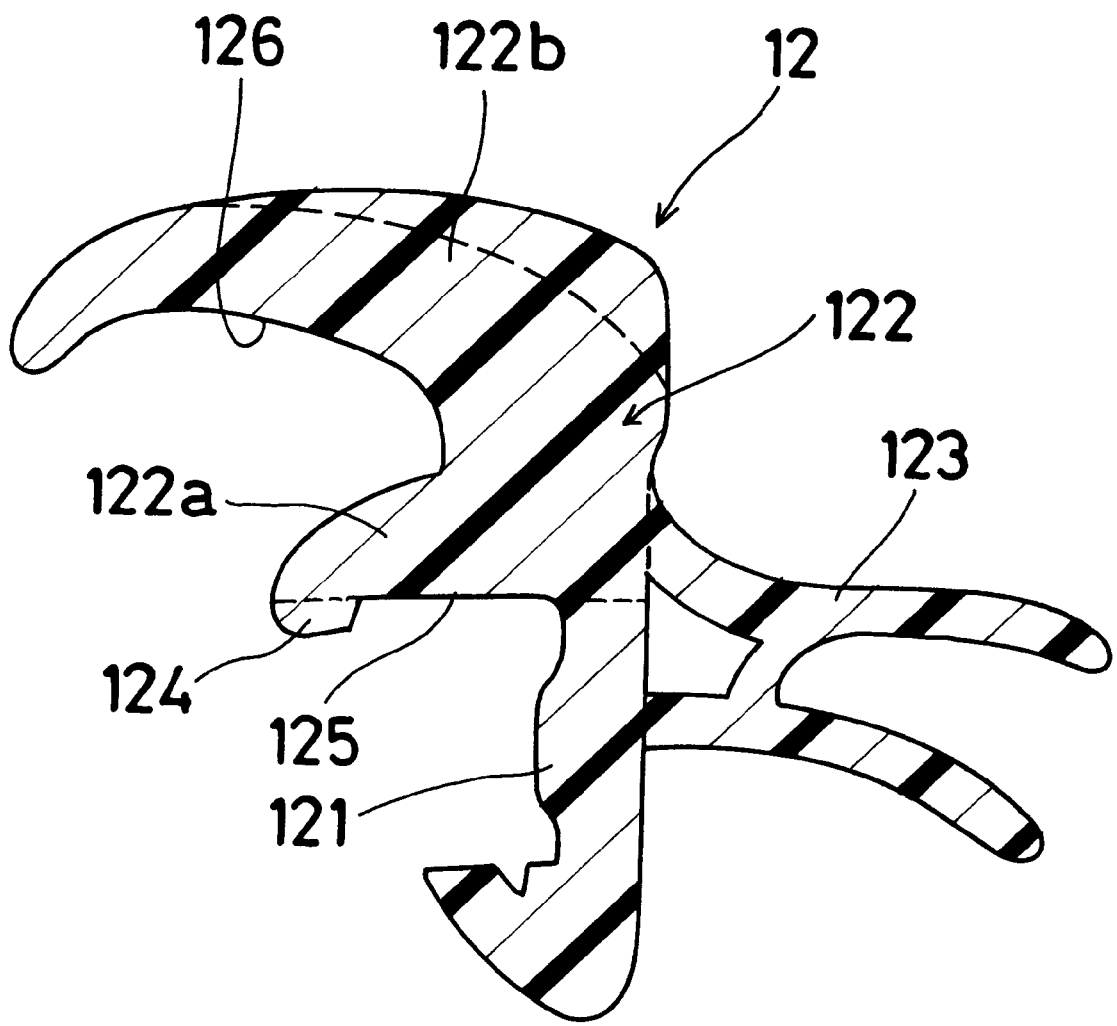

As shown in FIGS. 2, 6 and 7, the side section 12 is formed of a vinyl chloride resin and includes, across the entire length thereof (on the left side of point b in FIG. 2), a leg portion 121, a head portion 122, a resilient lip 123, a small protuberance 124, a glass insertion groove 125 and a rain gutter portion 126. The leg portion 121 is continuously formed with the leg portion 131 of the corner section 13 and formed in the same shape as the leg portion 131. The head portion 122 is continuously formed with the head portion 132 of the corner section 13.

As shown in FIG. 6 and 7, the head portion 122 includes a body portion 122a having a constant cross section, and a gradually transforming portion 122b having a gradually transforming cross section. The body portion 122a is formed in the same shape as the head portion 112 of the upper section 11. The gradually transforming portion 122b has a cross section which becomes wider when going from an upper side to a lower side in FIG. 1, or going to the left side in FIG. 2, and has a design surface on the top end surface in FIGS. 6 and 7.

The resilient lip 123 is continuously formed with the resilient lip 133 of the corner section 13 and is formed in the same shape as the resilient lip 113. The connecting position of the resilient lip 123, as shown in FIG. 2, is gradually shifted upward in FIG. 2. The resilient lip 123 is secured to the vehicle body panel 3 to prevent rain or the like from entering the inside from the outside. The small protuberance 124 is formed continuously with the small protuberance 134 of the corner section 13 and has the same shape as the small protuberance 114. The glass insertion groove 125 is for fitting the side edge of the windshield 2 therein and is formed continuously with the glass insertion groove 135 of the corner section 13.

Figure 8:
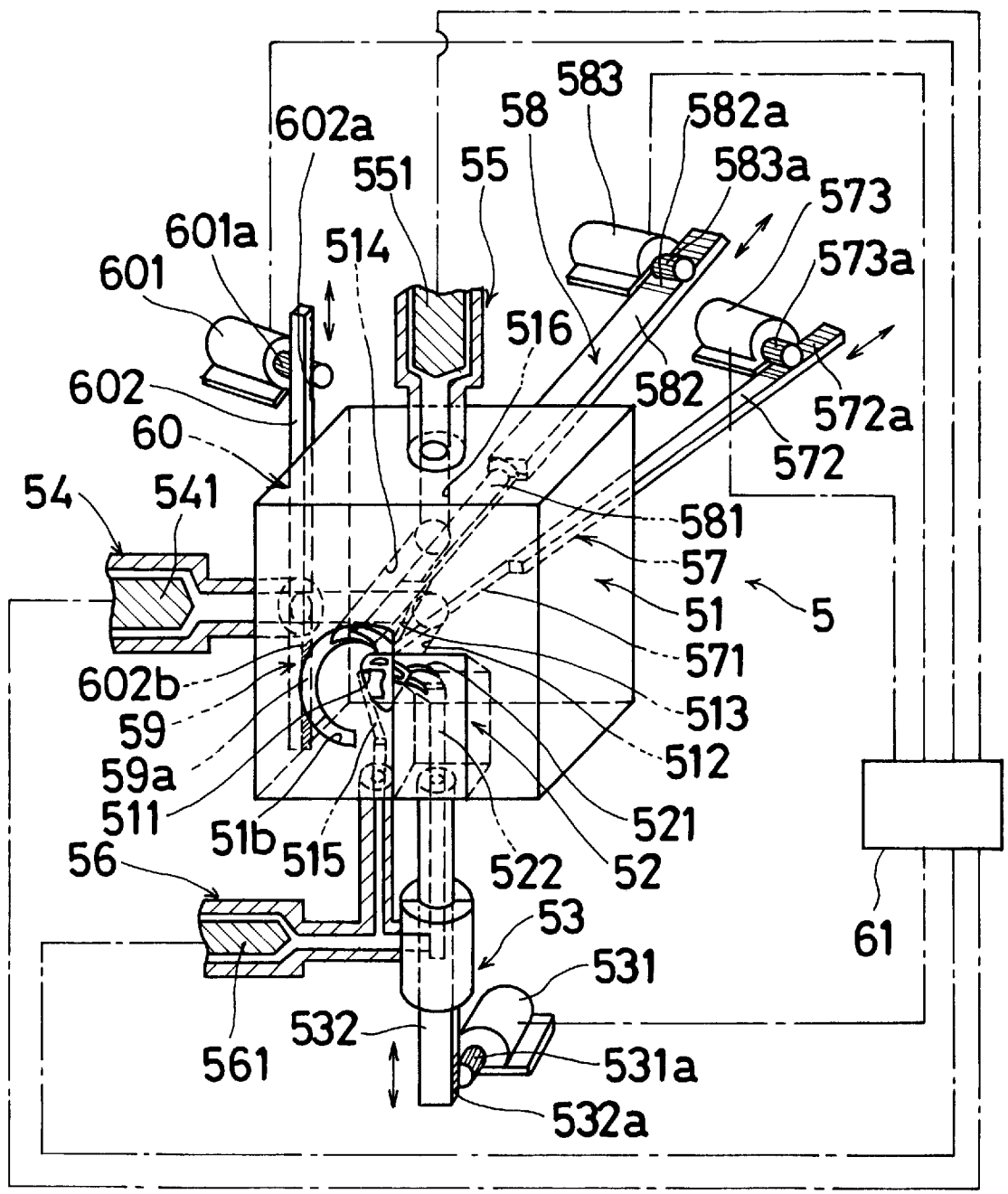
FIG. 8 is a schematic illustration showing the entire manufacturing apparatus for the windshield molding according to an embodiment of the invention.
Figure 9:
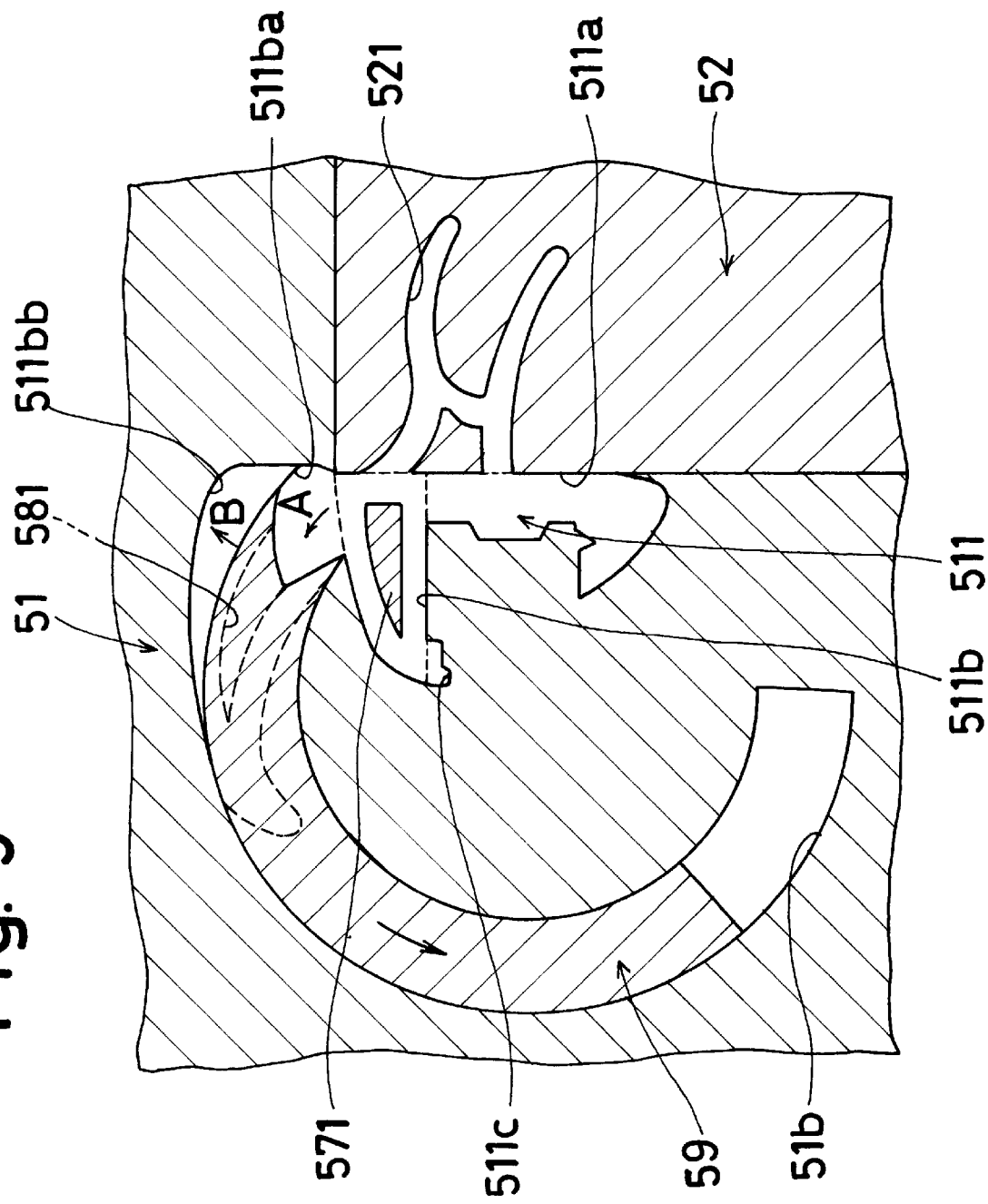
FIGS. 9 and 10 are vertical, lateral cross sections, respectively, showing an essential portion of the manufacturing apparatus shown in FIG. 8.
Figure 10:
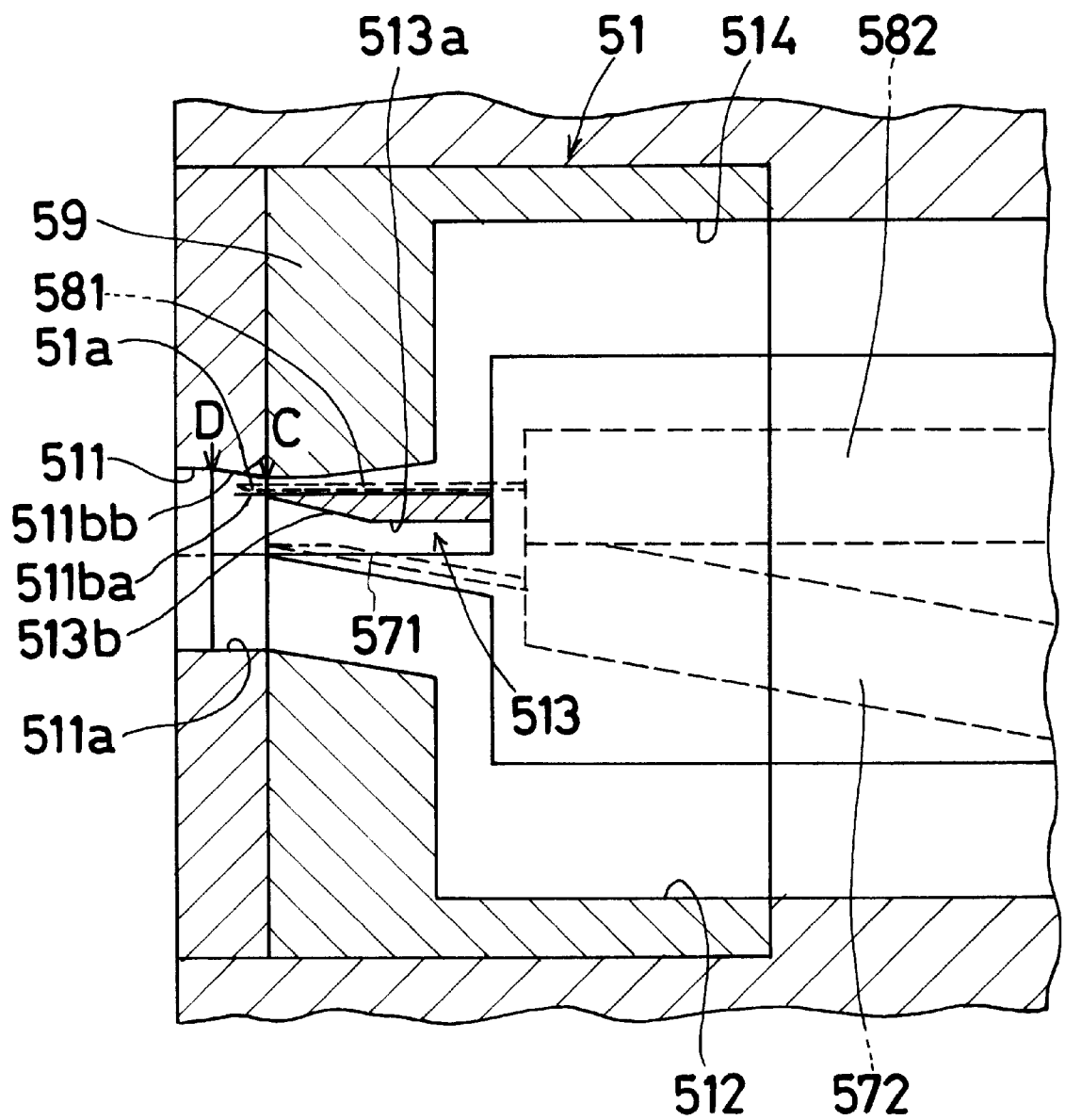

Referring now to FIGS. 8 to 10, the apparatus 5 for manufacturing the windshield molding (profile extrusion molded article) 1 is described. The apparatus 5 includes a stationary die block 51, a movable die block 52, a drive apparatus 53 for the movable die block 52, first to third extruders 54 to 56, first and second flow direction controllers 57 and 58, a rotary die head 59, a rotary die head drive apparatus 60, and a control panel 61.

As shown in FIG. 8, the stationary die block 51 has a resin outlet (aperture) 511 substantially identical to the maximum cross-sectional shape of the windshield molding 1 shown in FIG. 7. As shown in FIG. 9, the resin outlet 511 includes a leg portion opening 511a having the same shape as the leg portions 111, 131 and 121 of the upper, corner and side sections 11, 13 and 12, a head portion opening 511b having the same shape as the maximum cross-sectional shape shown in FIG. 7 of the head portion 122 of the side section 12, and a protuberance portion opening 511c having the same shape as the protuberance portions 114, 134 and 124 of the upper, corner and side sections 11, 13 and 12. The head portion opening 511b is divided into a lower opening 511ba and an upper opening 511bb by a diaphragm 51a shown in FIG. 10 and formed in a united body with the stationary die block 51.

The movable die block 52 is for continuously forming the resilient lips 113 and 133 of the upper and corner sections 11 and 13 in which the connecting position is unchanged, and the resilient lip 123 of the side section in which the connecting position thereof is gradually changed. The movable die block 52 is arranged in the stationary die block to be slidable in the up and down direction in FIG. 8, i.e., in the extending direction of the leg portion opening 511a. The movable die block 52 has a resin outlet (lip portion opening) 521 having the same shape as the resilient lips 113, 133 and 123. The resin outlet 521 opens in the same direction as the resin outlet 511 of the stationary die block 51, i.e., in a direction for delivering the resin material. The movable die block drive apparatus 53 drives the movable die block 52 and includes a motor 531 and a connection member 532. The motor 531 has a gear 531a on the output shaft thereof and rotates according to instruction from the control panel 61. The connection member 532 has a rack 532a engaging the gear 531a of the motor 531, thereby traveling in the up and down direction in FIG. 8. The top end of the connection member 532 is connected to the movable die block 52.

The stationary die block 51 is formed with a first resin passage 512 for feeding a resin material to the leg portion opening 511a corresponding to the leg portions, a second resin passage 513 for feeding the resin material to the lower opening 511ba of the head portion opening 511b corresponding to the head portions, a third resin passage 514 for feeding the resin material to the upper opening 511bb of the head portion opening 511 material to the protuberance portion opening 511c corresponding to the small protuberance portions. The first resin passage 512 is connected to the first extruder 54; the second and third resin passages 513 and 514 are connected to the second extruder 55 through a main resin passage 516. A fourth resin passage 515 is connected to the third extruder 56.

As shown in FIG. 10, the second resin passage 513 includes, at the downstream side end, a minimum width portion 513a having a width corresponding to the head having the smallest cross-sectional shape, i.e., to the head portion 112 of the upper section 11, and a gradually transforming width portion 513b having a width corresponding to the head having a gradually transforming cross section, i.e., one corresponding to the head portion 132 shown in FIG. 4. On the other hand, the movable die block 52 is formed with a resin passage 522 for feeding the resin material to the resin outlet (lip portion opening) 521. The resin passage 522 is connected to the third extruder 56.

The first extruder 54 extrudes resin material of a fixed amount to the inlet of the first resin passage 512 and has a screw inside thereof. The screw 541 rotates with a fixed speed according to instructions from the control panel 61. The second extruder 55 extrudes resin material to the inlet of the main resin passage 516 with a gradually changing amount and has a screw inside thereof. The screw 551 can change its speed as to correspond the shape to be molded according to instructions from the control panel 61. The third extruder 56 extrudes resin material of a fixed amount to the inlets of the fourth resin passage 515 and the resin passage 522, and includes a screw 561 inside thereof. The screw 561 rotates with a fixed speed according to instructions from the control panel 61.

The first flow direction controller 57 changes the flow direction of the resin material flowing through the second resin passage 513 in communication with the lower opening 511ba of the head portion opening 511b in correspondence to the amount of resin material extruded from the second extruder 55. The first flow direction controller 57 includes a slide plate 571, a support 572 and a motor 573.

As shown in FIG. 10, the slide plate 571 is arranged within the stationary die block 51 to be slidable in an obliquely up and down direction. The slide plate 571 can travel from a non-operational position where the plate does not enter the second resin passage 513 to an operational position where the plate does enter the second resin passage 513. When the slide plate 571 is at the non-operational position, the resin material flows within the second resin passage 513 in the same direction as the delivery direction. The flow direction of the resin material changes to the A direction in FIG. 9 according to movement of the slide plate from the non-operational position to the operational position. As shown in FIG. 9, the slide plate 571 has a crescent cross-sectional shape and a width which narrows toward the left side in FIG. 9.

The support 572 supports the slide plate 571 and is made to travel unitedly in the same direction as the slide plate 571. The support 572 is guided by the stationary die block 51 and designed not to rattle in the up and down direction in FIG. 8. Although a part of the support 572 is arranged within the stationary die block 51, the other part of the support 572 is arranged outside the stationary die block 51. A rack 572a is formed at the other part of the support 572. The rack 572a engages a gear 573a provided on an output shaft of the motor 573. Accordingly, when the motor 573 rotates, the support 572 and the slide plate 571 slide by this engagement. The motor 573 is connected electrically to the control panel 61 and rotates according to instructions from the control panel 61.

The second flow direction controller 58 changes the flow direction of the resin material flowing through the third resin passage 514 in communication with the upper opening 511bb of the head portion opening 511b in correspondence to the amount of the resin material extruded from the second extruder 55. The second flow direction controller 58 includes a slide plate 581, a support 582 and a motor 583.

As shown in FIGS. 8 to 10, the slide plate 581 is arranged within the third resin passage 514 to be slidable in the horizontal direction. The slide plate 581 can travel from position C to position D in FIG. 10. As shown in FIG. 9, the slide plate 581 is in a crescent cross-sectional shape, extends in the extending direction of the upper opening 511bb, and has a width which narrows upwardly in FIG. 9. The slide plate 581 changes the flow direction of the resin material flowing in the third resin passage 514 from the same direction as the delivery direction of the resin material to the B direction (upper right direction) in FIG. 9 by movement thereof from the C position to the D position.

The support 582 supports the slide plate 581 and is made to travel unitedly in the same direction as the slide plate 581. The support 582 is guided by the stationary die block 51 and designed not to rattle in the up and down direction in FIG. 8. Although a part of the support 582 is arranged within the stationary die block 51, the other part of the support 582 is arranged outside the stationary die block 51. A rack 582a is formed at the other part of the support 582. The rack 582a engages a gear 583a provided on an output shaft of the motor 583. Accordingly, when the motor 583 rotates, the support 582 and the slide plate 581 slide by this engagement. The motor 583 is connected electrically to the control panel 61 and rotates according to instructions from the control panel 61.

The rotary die head 59 changes the resin amount supplied to the upper opening 511bb of the head portion opening 511b of the third resin passage 514 according to the amount of resin material extruded from the second extruder 55 and produces the gradually transforming portion 132b of the head portion 132 shown in FIG. 5. The rotary die head 59 is slidably guided in a guide groove 51b formed within the stationary die block 51. One end of the rotary die head 59 is in a shape corresponding to the lower line of the upper opening 511bb of the head portion opening 511b, and the other end of the rotary die head 59 is in a flat shape. The rotary die head 59 rotates in the arrow direction from a position at which the one end thereof is superposed on the upper opening 511bb (shown in FIG. 9) to a position at which the one end is not superposed on the upper opening 511bb. A gear 59a is formed at the outer periphery of the rotary die head 59.

The rotary die head drive apparatus 60 rotates the rotary die head and includes a motor 601 and a connection bar 602. The motor 601 has a gear on the output shaft thereof and rotates according to instructions from the control panel 61. The connection bar 602 has a first rack 602a engaging the gear 601a of the motor 601 and a second rack 602b engaging the gear 59a of the rotary die head 59. Accordingly, when the motor 601 rotates, the connection bar 602 moves in the up and down direction in FIG. 8, thereby rotating the rotary die head 59 in the arrow direction in FIG. 9.

The control panel 61 stores respective time periods corresponding to respective lengths of the upper, corner and side sections, and outputs control signals based on the elapsed times for extruding amounts at the first to third extruders 54 to 56, traveling amounts of the slide plate 571, 581, a rotary amount of the rotary die head 59, and a traveling amount of the movable die block 52.

Referring to FIGS. 8 to 11, in the manufacturing method for the windshield molding 1 using the apparatus 5, first the first to third extruders 54 to 56 are operated, based on instruction from the control panel 61, at time T0 in FIG. 11 to extrude the resin material of a fixed amount from the first extruder 54 to the leg portion opening 511a through the first resin passage 512, to extrude the resin material of the fixed amount from the second extruder 55 to the lower opening 511ba of the head portion opening 511b through the second resin passage 513, and to extrude the resin material of the fixed amount from the third extruder 56 to the protuberance portion opening 511c through the fourth resin passage 515 and to the lip portion opening 521 through the resin passage 522. As a result, the resin material of a fixed amount is extruded outside the stationary die block 51 from the openings 511a, 511ba, 511c and 521, thereby producing the upper section 11 through a cooling process. This operation is continued up to time T1.

Then, between times T1 and T2, based on instructions from the control panel 61, the extruding amount of the second extruder 55 is gradually increased while the extruding amounts of the first and third extruders 54 and 56 remain unchanged. At the same time, in correspondence to the change of the extruding amount of the second extruder 55, the slide plate 571 is gradually made to move from the non-operational position at which the plate does not enter in the second resin passage 513 to the operational position at which the plate enters the passage, thereby changing the flow direction of the resin material flowing in the second resin passage 513 to the A direction in FIG. 9 (upper left direction).

Upon this operation, resin material of a fixed amount is extruded from the leg portion opening 511a, the protuberance portion opening 511c and the lip portion opening 521, and resin material of a gradually changing amount is extruded from the lower opening 511ba of the head portion opening 511b to outside the stationary die block 51. After cooling, the molding is formed with the corner section 13 having the gradually transforming portion 132b as shown in FIG. 4. It is to be noted that the resin material is not extruded to the upper opening 511bb between time T0 and time T2 because the rotary die head 59 is located at the position shown in FIG. 9 and cuts off the communication between the third resin passage 514 and the upper opening 511bb of the head portion opening 511b.

Subsequently, between times T2 and T3, based on instructions from the control panel 61, the extruding amount of the second extruder 55 is further gradually increased at the same rate as between times T1 and T2, while the extruding amounts of the first and third extruders 54 and 56 remain unchanged. The rotary die head 59, at that time, is rotated from the position shown in FIG. 9 to the position at which the die head 59 is not superposed on the upper opening 511bb of the head portion opening 511b, in correspondence to the extruding amount of the second extruder 55 to the instruction of the control panel 61.

Upon this operation, the extruding amount to the upper opening 511bb through the third resin passage 514 is gradually increased in correspondence to the extruding amount of the second extruder 55. At the same time, in correspondence to the change of the extruding amount of the second extruder 55, the slide plate 581 is gradually made to move from the C position in FIG. 10 to that shown in FIG. 10 while the slide plate 571 is maintained at the operational position, thereby changing the flow direction of the resin material flowing from the third resin passage 514 to the upper opening 511bb to the B direction in FIG. 9 (upper left direction in FIG. 10).

By operation of the first to third extruders 54 to 56, the rotary die head 59, and the slide plates 571 and 581 thus described, resin material of a fixed amount is extruded from the leg portion opening 511a, the lower opening 511ba of the head portion opening 511b, the protuberance portion opening 511c and the lip portion opening 521 to the outside of the stationary die block 51, and the resin material of a gradually changing amount is extruded from the upper opening 511bb of the head portion opening 511b to outside of the stationary die block 51. After cooling, the molding is formed with the corner section 13 having the gradually transforming portion 132b as shown in FIG. 5.

It is to be noted that to form the gradually transforming portion, the extruding amount of the second extruder 55 can be gradually increased for the entire period between time T1 and time T3 while the slide plate 571 is gradually shifted to the operational position, or namely, the second extruder 55 and the slide plate 571 only may be operated in conjunction with each other. The second extruder 55, the slide plate 571, and the rotary die head 59 can be operated in conjunction with each other for the entire period between time T1 and time T3 to form the gradually transforming portion. Moreover, the second extruder 55 and the rotary die head 59 only can be operated in conjunction with each other for the entire period between time T2 and time T3 to form the gradually transforming portion. Furthermore, the second extruder 55, the slide plate 571, and the rotary die head 59 can be operated in conjunction with each other for the entire period between time T2 and time T3 to form the gradually transforming portion.

Finally, between time T3 and time T4, according to the instruction of the control panel 61, the extruding amount of the second extruder 55 to the second and third resin passages 513, 514 is gradually increased with a slower speed than that between time T1 and time T3 while the extruding amounts of the first and third extruders 54, 56 are unchanged. At the same time, as to correspond to changes of the extruding amount of the second extruder 55, the slide plate 581 is gradually made to move from the situation shown in FIG. 10 to D position in FIG. 10 while the slide plate 571 is maintained at the operational position, thereby maintaining the flow direction of the resin material flowing from the third resin passage 514 to the upper opening 511bb to B direction in FIG. 9 (or upper left direction in FIG. 10). The rotary die head 59 is maintained at that time at the position at which the die head is not superposed on the upper opening 511bb of the head portion opening 511b. By this operation, the supplied amount to the upper opening 511bb of the third resin passage 514 is maintained at the maximum.

By operation of the first to third extruders 54 to 56, the rotary die head 59, and the slide plates 571 and 581 thus described, the resin material of a fixed amount is extruded from the leg portion opening 511*a*, the lower opening 511*ba* of the head portion opening 511*b*, the protuberance portion opening 511*c* and the lip portion opening 521 to the outside of the stationary die block 51, and the resin material of a gradually changing amount is extruded from the upper opening 511*bb* of the head portion opening 511*b* to the outside of the stationary die block 51. After cooling, the molding is formed with the side section 12 having the gradually transforming portion 122*b* as shown in FIGS. 2 and 7.

It is to be noted that although in the embodiments above, the windshield molding 1, the apparatus for manufacturing the windshield molding 1 and the manufacturing method for the windshield molding 1 are described, the apparatus and method of the invention are not limited to those embodiments and the invention can apply to manufacturing a resin molding such as a belt molding, a roof molding, and the like or an SUS integrated resin molding.

This invention has the following effects. Because the resin material of the gradually changing amount is extruded to the inlet of the resin passage, no extra resin remains in the resin passage, so that no bypass passage is needed and that the resin material is no longer discharged outside the stationary die block. Therefore, the apparatus is advantageous in cost. The profile extrusion molded articles having a gradually transforming portion are molded by extruding the resin material of a gradually changing amount to the inlet of the resin passage by means of the extruder and by changing the flow direction in the resin passage by the flow direction controllers in accordance with the extruding amount of the resin material. Therefore, it is unnecessary to use a shutter for changing the size of the aperture in the shape of the maximum cross section of the gradually transforming portion, and therefore no line tracing the movement of the shutter will appear on the design face of the extrusion molded articles. Since the flow direction of the resin material in the resin passage is changed in accordance with the extruding amount of the resin material by the flow direction controlling means, the extrusion molded articles are not formed with indentations or bumps, thereby improving the quality of the molded articles.

The foregoing description of a preferred embodiment of the invention has been presented for purposes of illustration and description, and is not intended to be exhaustive or to limit the invention to the precise form disclosed. The description was selected to best explain the principles of the invention and their practical application to enable others skilled in the art to best utilize the invention in various embodiments and various modifications as are suited to the particular use contemplated. It is intended that the scope of the invention not to be limited by the specification, but be defined by the claims set forth below.

What is claimed is:

1. A manufacturing method for profile extrusion molded articles having a gradually transforming portion at which a cross section shape gradually changes, comprising the steps of:

using a stationary die block having an aperture in a shape of the maximum cross section of the gradually transforming portion and a resin passage in communication with the aperture, a resin extruder extruding a gradually changing amount of resin material to an inlet of the resin passage, flow direction controlling means for changing a flow direction of the resin material flowing within the resin passage in accordance with the amount of the resin material extruded by said extruder, and a rotary die head configured to be movable so as to change a size of a portion of the aperture exposed to the resin passage, said rotary die head configured to increase the size of the aperture exposed to the resin passage as the amount of resin extruded is increased; and extruding a gradually changing amount of resin material through the resin passage to the aperture from the extruder;

moving said rotary die head so as to increase the size of the portion of the aperture exposed to the resin passage; and changing the flow direction of the resin material flowing through the resin passage, during said step of moving said rotary die head, in accordance with the amount of the resin material in the extruder by causing at least one slide plate to enter and retire from said resin passage along a direction oblique with respect to an axis of the resin passage, thereby changing the flow direction of the resin in the flow passage.

2. The manufacturing method according to claim 1, wherein said step of changing the flow direction of the resin material further comprises moving said slide plate so as to change the direction of the resin flowing through the resin passage from a delivery direction to a direction oblique with respect to the axis of the resin passage.

3. An apparatus for manufacturing profile extrusion molded articles having a gradually transforming portion at which a cross section shape gradually changes, comprising:

a stationary die block having an aperture in a shape of the maximum cross section of the gradually transforming portion and a resin passage in communication with the aperture;

a resin extruder, said extruder extruding a gradually changing amount of resin material to an inlet of the resin passage; and flow direction controlling means for changing a flow direction of the resin material flowing within the resin passage in accordance with the amount of the resin material extruded by said extruder, comprising at least one slide plate configured to enter and retire from the resin passage provided within the stationary die block along a direction oblique with respect to an axis of the resin passage, and a rotary die head configured to be movable so as to change a size of a portion of the aperture exposed to the resin passage, said rotary die head configured to increase the size of the aperture exposed to the resin passage as the amount of resin extruded is increased.

4. The manufacturing apparatus according to claim 3, wherein said slide plate is configured to direct said resin material in a direction oblique with respect to said axis of said resin passage when said slide plate is entered into said resin passage.

5. The manufacturing apparatus according to claim 4, wherein said slide plate cooperates with said aperture to direct said resin material in said direction oblique with respect to said axis of said resin passage.

* * * * *